(No Model.)
D. G. STONE.
DOUGH MIXER AND KNEADER.
No. 413,417. Patented Oct. 22, 1889.
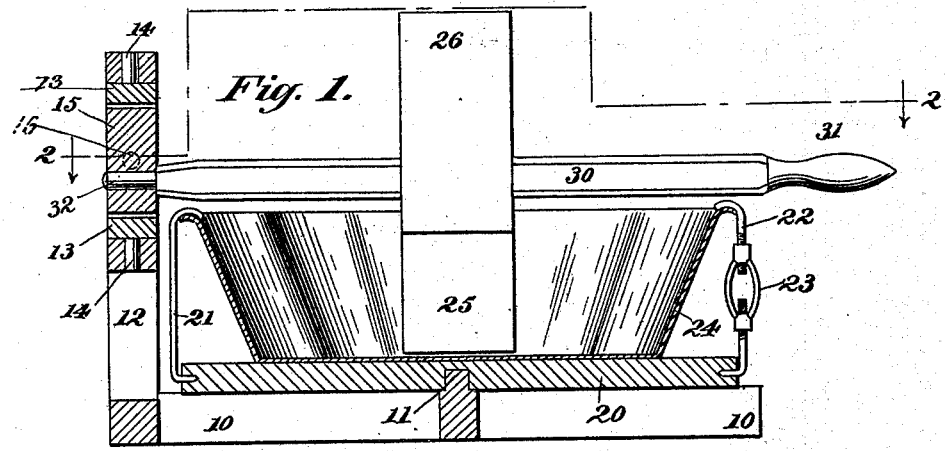
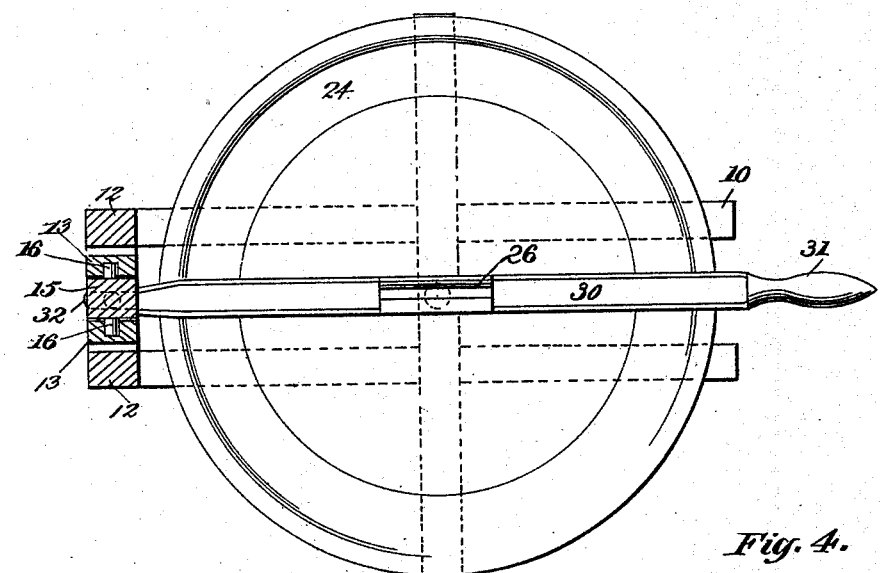
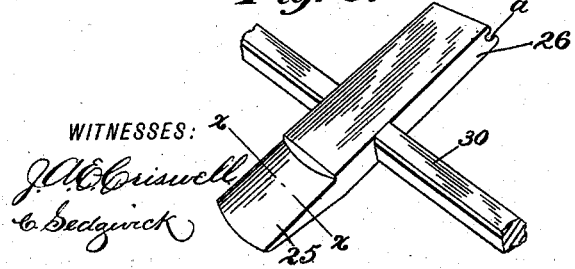
WITNESSES:
J. A. C. Criswell
C. Sedgwick
INVENTOR
D. G. Stone
Munn & Co.
ATTORNEY

UNITED STATES PATENT OFFICE.

DUDLEY G. STONE, OF NEGAUNEE, MICHIGAN.

DOUGH MIXER AND KNEADER.

SPECIFICATION forming part of Letters Patent No. 413,417, dated October 22, 1889.

Application filed April 6, 1889. Serial No. 306,166. (No model.)

*To all whom it may concern:*

Be it known that I, DUDLEY G. STONE, of Negaunee, in the county of Marquette and State of Michigan, have invented a new and Improved Dough Mixer and Kneader, of which the following is a full, clear, and exact description.

The object of my invention is to provide a simple, cheap, and convenient apparatus by means of which dough may be mixed and kneaded, the implement being more especially designed for family use.

Reference is to be had to the accompanying drawings, forming a part of this specification, in which similar figures of reference indicate corresponding parts in all the views.

Figure 1 is a central longitudinal sectional view of my improved mixer and kneader. Fig. 2 is a sectional plan view of the same, the view being taken on line 2 2 of Fig. 1. Fig. 3 is a perspective view of a portion of the kneader and mixer and a portion of the lever-arm by which said kneader and mixer are carried, and Fig. 4 is a cross-sectional view on line $x\ x$ of Fig. 3.

In the drawings, 10 represents a frame formed with a central stud 11, and to one end of which there is secured a vertical frame 12, in which there is mounted a block 13, the block 13 being supported by trunnions 14, which ride in vertical bearings formed in the frame 12. The block 13 is centrally apertured to receive a block 15, which said block 15 is supported by horizontal trunnions 16, that ride in bearings formed in the block 13.

Upon the frame 10, I place a table 20, that is formed with an aperture adapted to receive the stud 11, upon which stud the table is free to turn. To one side of the table I secure a hook 21, and to the opposing edge a hook 22, that is provided with a turn-buckle 23, the arrangement being such that the edge of the mixing-pan 24 may be slipped under the hook 21, and the hook 22 may be brought into engagement with the opposing edge by turning down the turn-buckle, as will be readily understood.

In order that the materials contained within the pan 24 may be properly mixed and kneaded, I provide a mixer 25 and kneader 26—such as those shown in Fig. 3—the combined mixer and kneader being supported by a lever 30, that is formed with a handle 31 and with a projection 32, adapted to enter an aperture in the block 15. Any proper form of mixer might be employed; but in practice I prefer to form such mixer so that it will be concavo-convex in cross-section, as shown in Fig. 4. The kneader is preferably formed with a groove $a$; but this is not essential.

In operation the ingredients to be mixed are placed in the pan, and the parts are adjusted as represented in Fig. 1, when by reciprocating and turning the lever the ingredients may be thoroughly mixed. When the kneading takes place, the lever is simply turned so as to bring the kneader in operative position, and when, after the preliminary kneading has taken place, it is desired to mold the dough the lever is removed, the turn-buckle 23 turned off, and the pan taken from the table, after which the table may be used for molding the dough to a proper form before placing it in the pans.

The advantages of the above construction will be appreciated by those skilled in the art of bread-making.

Having thus described my invention, I claim as new and desire to secure by Letters Patent—

1. In a dough mixer and kneader, the combination, with a supporting-frame, of a swivel secured in the frame and the lever 30, loosely and removably connected to the swivel and provided with the mixer 25 and the kneader 26, projecting from opposite sides thereof, substantially as described.

2. In a dough mixer and kneader, the combination, with the supporting-frame 10 12, of the table 20, mounted to turn on the said frame, and the lever 30, having one end connected to the frame by a swiveled connection and provided with the mixer 25 and kneader 26, the said mixer and kneader projecting from opposite sides of the lever, substantially as herein shown and described.

3. The combination, with a revoluble table, of hooks carried thereby, a mixing-pan arranged to be engaged by said hooks, a frame 12; a block 13, mounted on vertical trunnions and supported by the frame, a block 15, mounted on horizontal trunnions which ride in apertures formed in the block 13, a lever 30, a combined mixer and kneader carried thereby, and a projection 32 formed thereon, said projection being arranged to enter an aperture formed in the block 15, substantially as described.

DUDLEY G. STONE.

Witnesses:
FRANK D. STONE,
GRACE STONE.